US009065738B2

(12) United States Patent
Ennis, Jr. et al.

(10) Patent No.: US 9,065,738 B2
(45) Date of Patent: Jun. 23, 2015

(54) METHODS AND APPARATUS FOR IDENTIFYING THE IMPACT OF CHANGES IN COMPUTER NETWORKS

(71) Applicant: Infoblox Inc., Santa Clara, CA (US)

(72) Inventors: James D. Ennis, Jr., Queenstown, MD (US); Fiore Louis Nardo, II, Mt. Airy, MD (US); John Dominic Belamaric, Bethesda, MD (US)

(73) Assignee: Infoblox Inc., Santa Clara, CA (US)

( * ) Notice: Subject to any disclaimer, the term of this patent is extended or adjusted under 35 U.S.C. 154(b) by 0 days.

(21) Appl. No.: 14/062,690

(22) Filed: Oct. 24, 2013

(65) Prior Publication Data

US 2014/0122669 A1    May 1, 2014

Related U.S. Application Data

(63) Continuation of application No. 13/782,085, filed on Mar. 1, 2013, now Pat. No. 8,595,476, which is a continuation of application No. 13/365,016, filed on Feb. 2, 2012, now Pat. No. 8,412,925, which is a continuation of application No. 12/496,295, filed on Jul. 1, 2009, now Pat. No. 8,131,992.

(51) Int. Cl.
*H04L 12/24* (2006.01)

(52) U.S. Cl.
CPC ........ *H04L 41/0893* (2013.01); *H04L 41/0853* (2013.01); *H04L 41/22* (2013.01); *H04L 41/0803* (2013.01)

(58) Field of Classification Search
CPC ........................ H04L 41/0893; H04L 41/0803

USPC ....... 713/1, 100; 370/254; 455/403; 702/182, 702/188; 709/220, 223

See application file for complete search history.

(56) References Cited

U.S. PATENT DOCUMENTS

| 6,349,306 | B1 * | 2/2002 | Malik et al. ................... 707/779 |
| 6,744,780 | B1 * | 6/2004 | Gu et al. ........................ 370/450 |
| 6,930,985 | B1 * | 8/2005 | Rathi et al. .................... 370/254 |
| 7,225,250 | B1 * | 5/2007 | Harrop .......................... 709/224 |
| 7,415,706 | B1 * | 8/2008 | Raju et al. ..................... 717/170 |
| 7,478,145 | B2 * | 1/2009 | Braun et al. ................... 709/220 |
| 7,848,259 | B2 * | 12/2010 | Gray et al. .................... 370/255 |
| 2004/0054764 | A1 * | 3/2004 | Aderton et al. ............... 709/223 |
| 2008/0059623 | A1 * | 3/2008 | Yang et al. .................... 709/223 |
| 2010/0290344 | A1 * | 11/2010 | Meloche ....................... 370/241 |

* cited by examiner

*Primary Examiner* — Stefan Stoynov
(74) *Attorney, Agent, or Firm* — Van Pelt, Yi & James LLP

(57) ABSTRACT

The impact of device configuration changes on operational issues and policy compliance in a computer network can be discerned from a visual data presentation that jointly shows representations of changes, issues, and policy compliance in a common view for a group of network devices. Configuration information is collected from devices in the computer network and processed to determine whether a change has occurred in a configuration of any of the devices, whether any operational issues exist for each of the devices, and whether any of the devices are not in compliance with any applicable operational policies. A display device displays the visual data presentation to allow an operator to see trends and relationships between device configuration changes and operational issues and incidents of policy non-compliance. The visual data presentation can be depicted as a graphical timeline view, a network topology view, or a table view of the information.

24 Claims, 5 Drawing Sheets

| DASHBOARD | NETWORK ANALYSIS | NETWORK EXPLORER | CONFIGURATION MANAGEMENT | REPORTS | | | | |
|---|---|---|---|---|---|---|---|---|

ENTIRE NETWORK YYYY-MM-DD / 7-DAY ⑦

| INVENTORY | SUMMARIES | TOPOLOGY | |
|---|---|---|---|

DEVICES / INTERFACES «
☐ DEVICES
☐ INTERFACES

DEVICES

DISPLAYING 1-28 OF 46     VIEWS ▼ FILTERS 🔍 ▢

| IP ADDRESS | DEVICE NAME | TYPE | VENDOR | MODEL | CHANGES | ISSUES | POLICY COMPLIANCE |
|---|---|---|---|---|---|---|---|
| 4.10.50.5 | QALRGENT03 | NETMRI (99%) | ABC | 001 | 2 | ⊖ | ☑ |
| 220.40.20.1 | QALABFW02 | FIREWALL (99%) | ABC | 002 | 3 | △ | ☒ |
| 220.20.50.5 | QALABSWRTR05 | SW ROUTER (99%) | ABC | 003 | | | ☑ |
| 220.20.10.5 | QALABSWRTR01 | SW ROUTER (99%) | ABC | 003 | 4 | ⊖ | ☑ |
| 221.10.10.1 | QADYNRTR001 | ROUTER (99%) | ABC | 004 | 1 | ⊖ | ☑ |
| 221.10.10.6 | QADYNRTR1006 | ROUTER (99%) | ABC | 004 | 3 | | ☒ |
| 221.10.10.4 | QADYNRTR1004 | ROUTER (99%) | ABC | 004 | 1 | ⊖ | ☑ |
| 220.20.20.5 | QALABSWRTR02 | SW ROUTER (99%) | ABC | 003 | | | ☑ |
| 220.20.60.5 | QALABSWRTR06 | SW ROUTER (99%) | ABC | 003 | 2 | | ☑ |
| 221.10.20.1 | QADYNRTR1021 | ROUTER (99%) | ABC | 004 | | | ☑ |
| 221.10.20.4 | QADYNRTR1024 | ROUTER (99%) | ABC | 004 | 1 | ⊖ | ☒ |
| 220.10.60.5 | QALABRTR06 | ROUTER (99%) | ABC | 004 | 4 | △ | ☑ |
| 220.10.40.5 | QALABRTR04 | ROUTER (99%) | ABC | 004 | 1 | | ☒ |
| 220.20.40.5 | QALABSWRTR04 | SW ROUTER (99%) | ABC | 003 | 2 | ⊖ | ☒ |
| 220.10.50.5 | QALABRTR05 | ROUTER (99%) | ABC | 004 | 2 | ⊖ | ☑ |

FIG.5

METHODS AND APPARATUS FOR IDENTIFYING THE IMPACT OF CHANGES IN COMPUTER NETWORKS

CROSS REFERENCE TO OTHER APPLICATIONS

This application is a continuation of U.S. patent application Ser. No. 13/782,085, now U.S. Pat. No. 8,595,476, entitled METHODS AND APPARATUS FOR IDENTIFYING THE IMPACT OF CHANGES IN COMPUTER NETWORKS filed Mar. 1, 2013, which is a continuation of U.S. patent application Ser. No. 13/365,016, now U.S. Pat. No. 8,412,925, entitled METHODS AND APPARATUS FOR IDENTIFYING THE IMPACT OF CHANGES IN COMPUTER NETWORKS filed Feb. 2, 2012, which is a continuation of U.S. patent application Ser. No. 12/496,295, now U.S. Pat. No. 8,131,992, entitled METHODS AND APPARATUS FOR IDENTIFYING THE IMPACT OF CHANGES IN COMPUTER NETWORKS filed Jul. 1, 2009, which are incorporated herein by reference for all purposes.

BACKGROUND

A general principle in many technologies is that, once a system is properly set up, it will continue to work fine if left alone. This is especially true in enterprise computer networking. Unfortunately, business needs are constantly evolving and computer networks must change to adapt or risk becoming obsolete. Consequently, the typical enterprise computer network is constantly being modified. New equipment is added, old equipment is retired, and existing equipment is relocated or reconfigured to provide new capabilities. The larger and more complex the network is, the greater the rate of change and resultant instability, and the greater the likelihood and impact of problems resulting from poorly-executed changes. Failing to implement useful changes puts the organization at just as great a risk from competition and lack of productivity as allowing change to proceed unchecked. With these consequences in mind, most IT professionals are aware that change is something that must be clearly understood, carefully managed, and rigorously controlled.

Certain types of existing network management systems make it possible to recognize when changes have occurred, document what changes have taken place, establish whether the configuration resulting from those changes conforms to policy, and even automate steps to bring the configuration back into policy conformance. Other types of existing network management systems can identify problems in the configuration, operation, or performance of network infrastructure devices and notify the customer to take corrective actions. However, there remains a need for a system that allows the IT professional to get a quick, high-level understanding of the impact that changes have on a network infrastructure.

SUMMARY

Methods, apparatus, and software for identifying the impact of device configuration changes on operational issues and policy compliance in computer networks are described herein. In accordance with one embodiment, a network analysis system includes a data collection module that collects configuration and operational information from devices in a computer network, and a processor that determines whether a change has occurred in a configuration or operating state of any of the devices based on the collected configuration information. The processor further determines whether an operational issue exists for any of the devices based on the collected configuration and operational information and whether any of the devices are not in compliance with configuration policy based on the collected configuration information. A display device displays a visual data presentation that includes a representation of device or network infrastructure changes, operational issues, and policy compliance information in a common view for a group of devices in the computer network. The visual data presentation can depict the changes, issues, and policy compliance information in a graphical timeline view, a topology view, or a table view.

The timeline view includes a change graph displayed on a timeline and indicating a number of changes that occurred in each of a sequence of regular time periods for a selected group of devices in the computer network. In the same view, an issue graph is displayed on the timeline and indicates a number of operational issues in each of the sequence of time periods for the selected group of devices. A policy compliance graph is also depicted in the timeline view and indicates a degree of policy compliance for the selected group of devices as a function of time over the same timeline. The change graph and the issue graph can be bar graphs, and the policy compliance graph can be a line graph, for example. The timeline view may also include a change trend line (e.g., a line graph) indicating a measure of the number of configuration changes over a plurality of time periods. A hover ("mouse over") feature can be incorporated into the timeline view such that additional information about graphically represented changes or operational issues is displayed based on the position of a user-controlled cursor within the display area.

The topology view includes a device indicator (e.g., an icon) for each device in a selected group of devices in the network. Communication links between the device indicators can be depicted within the topology view. A change indicator (e.g., an icon) is displayed with the device indicator of each device for which a configuration change has occurred within a certain period of time (e.g., the past twenty-four hours). Each device for which an operational issue exists (or has developed within a certain period of time) has an issue indicator associated with the device indicator. For example, the issue indicator can be a colored background surrounding the device icon, with the color of the background indicating the degree of significance or severity of a device's most significant operational issue. A policy compliance indicator (e.g., another icon) is displayed with the device indicator of each device that is not in compliance with configuration policy. For example, one type of icon indicating policy non-compliance can be displayed next to the device indicator of each device that does not comply with at least one operating policy, and another type of icon can be displayed next to the device indicator of each device that is fully compliant with policy rules that apply to that device.

The table view includes a listing, in a table format, of a selected group of devices in the network. Each row in the table provides information about a particular device, and each column in the table depicts a field that provides a particular category of information. Thus, for example, each row may begin with a field that uniquely identifies a device in the selected group. A change field indicates which of the devices in the listing have had a configuration change within a certain time period. For example, the change field in a particular row can indicate with a symbol, icon, or numeral, information about whether that particular device has had one or more changes. An issue field indicates which of the devices in the listing are experiencing operational issues. For example, a symbol in the issue field can indicate a degree of significance or severity of a device's most significant operational issue. A policy compliance field indicates, via an icon, symbol, numeral, or the like, which of the devices in the listing are not in compliance with operational policies.

Any of the timeline, topology, and table views can include hyperlinks to other visual data presentations relating to more specific information about device or network changes, operational issues, and policy compliance. The network analysis system for identifying changes, operational issues, and policy compliance information and for controlling the display device to display the visual data presentations can be embodied in a computer readable medium (i.e., software) that is executed on a processor, computer, or the like.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

FIG. 5 is a screen shot of a table visualization of changes, issues, and policy compliance for a selected group of devices in a network.

DETAILED DESCRIPTION

Figure 1:
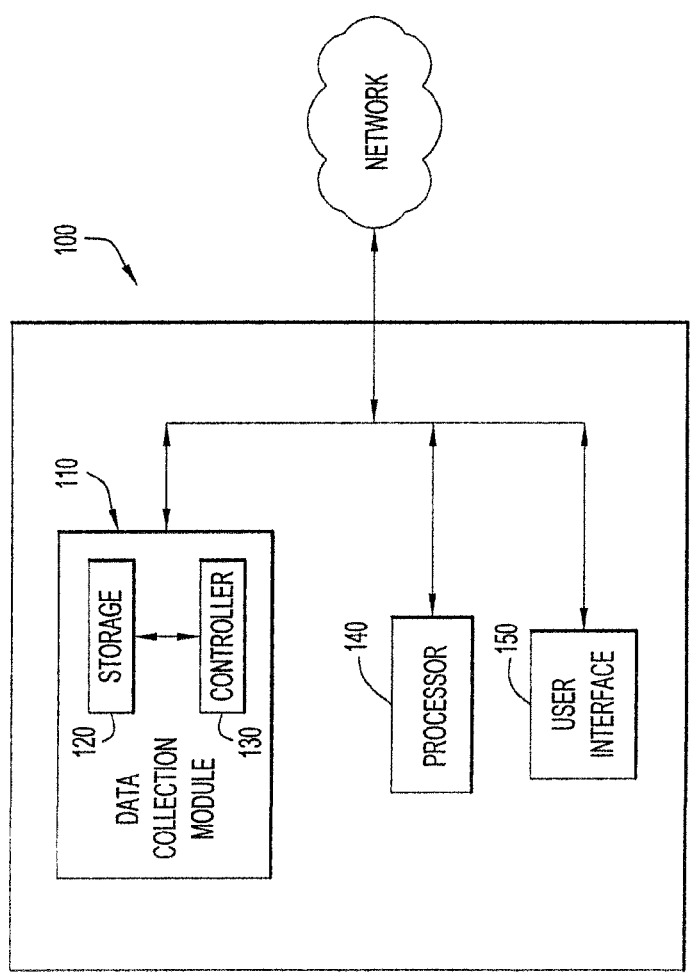
FIG. 1 is a functional block diagram of a network analysis system for collecting, processing, and displaying information that relates to changes, operational issues, and policy compliance for a group of devices in a network according to an exemplary embodiment.

The network analysis system described herein generates a visual data presentation that allows a user or administrator to draw conclusions about the impact of device configuration changes on other aspects of a network. In particular, each of a variety of visual data presentations jointly depicts, in a distinct manner, device changes that have occurred for a selected set or group of devices in the network (a "group" can be some or all of the devices in the network), operational issues that exist for the group of devices, and policy compliance information for the group of devices. By displaying changes, operational issues, and policy compliance information in combination, causal relationships between configuration changes and corresponding operational issues and instances of policy non-compliance can be discerned, allowing an operator to better understand and address the network's shortcomings.

As used herein, the term "change" refers to a modification or alteration to a device's configuration or operating state or condition that may affect how the device operates or performs or how the device interacts with other devices in the network or with users. For example, a change may involve adding, removing, or reconfiguring the hardware of a device. A change can also occur as the result of a detected hardware failure or malfunction. Installing, configuring, updating, uninstalling, or removing software or applications can also constitute a change. Likewise, a modification to a device's administrative settings can be a configuration change. Changes may result from an external action taken by a user or system administrator (e.g., loading an application or installing hardware) or may result from an automatic operation that occurs within the network (e.g., automatic or scheduled downloading and installing of software or auto-configuration operations).

As used herein, the term "operational issue" (or simply "issue") refers to an indication of a problem condition that should be addressed or a condition that may be of some interest to a system administrator. An issue can relate to the state of a device's configuration determined from collected configuration information, from a device's operating state determined from collected operational information (e.g., performance statistics, utilization levels, etc.), or from both. In many systems, when a problem is detected, it is treated as an event, and a one-time indication, alarm, or flag is generated to notify an operator that something has occurred. Many of these one-time event indicators may be generated over time, resulting in a continuous stream of indications. An issue is somewhat different in that an issue does not represent a one-time event but rather the ongoing problem condition that remains once an event has occurred that led to the problem condition. An issue remains open as long as this condition is present and is cleared only when the symptoms of the condition are removed, e.g., because the issue was addressed and resolved. Thus, an issue is a statement of a problem condition rather than of a discrete event. At any given time, many issues may exist in a network, and a report of outstanding issues can be used by a system administrator as a punch list to address the underlying problems.

Issues can be categorized according to the significance or severity of the situation. For example, a condition that is negatively impacting current operating conditions and requires immediate attention can be classified as an "error." A condition that may eventually lead to a significant operational problem can be classified as a "warning." A less serious condition that may nevertheless merit attention can be classified as "information." By classifying issues in this manner, resources can be allocated efficiently, such that an issue having the greatest potential to cause significant harm to the network or enterprise can be assigned appropriate resources to try to eradicate the issue from the network. The system of the present invention allows the network operator or administrator to observe that corrective changes caused an issue to be eliminated. Not all configuration changes result in an operational issue being created; rather, issues occur with respect to the configuration or operation of network devices as the result of choices or mistakes made or things that have gone wrong.

By way of example, an issue can be something as simple as a condition detected from a single piece of information, such as a physical or environmental problem. For example, a network switch may have two redundant power supplies. An issue would result from a determination that one of the power supplies has failed or that a power supply cooling fan has failed, creating a risk of overheating (in this case, the issue may be classified as a warning).

An operational issue can be identified as the result of a more complex analysis of multiple variables. For example, an "Ethernet duplex mode setting mismatch" can occur on an Ethernet interface as a result of an automatic negotiation between a server and a switch, wherein each device settles on a slightly different configuration for communicating across a link. The link may experience very poor performance due to such a duplex mode setting mismatch. To identify this type of issue, at least two pieces of information (i.e., device settings on both sides of the link) must be evaluated jointly. Identification of other types of issues relating to how devices are configured, interacting, or performing may involve analyzing in combination several pieces of information relating to device configurations.

An operational issue can also involve overuse (or underuse) of a particular network resource. For example, a particular server or switch in the network may experience an excessive processing load or data traffic, resulting in a bottleneck within the network. Such overuse can be identified via collected operational information (performance statistics) and may result from a configuration change within the network.

As used herein, the term "policy" refers to a collection of rules that the network and network devices are required or expected to follow, and "policy compliance" exists when a device is following the policy rules that apply to that device. These rules may come from a variety of sources such as from: an enterprise's internal "best practices" and requirements; the requirements of a third party that interacts with the enterprise, industry standards or best practices; or government regulatory requirements. Rules can relate to particular configurations, particular applications or versions of applications running on a device, or a particular use of the network. Policy compliance information can be used to evaluate whether a network is configured and operating according to prescribed rules that ensure the network will run smoothly.

The concept of IT governance is common in industry today. Not only do enterprises adopt IT procedures and processes, but also industry "best practices" that lead to more secure networks and networks that better protect private information. Such best practices attempt to yield more stable networks that are less likely to exhibit performance issues or outages. For example, the payment card industry has developed data security standards that specify certain network requirements, configurations, software, and/or procedures to be used in the networks of vendors who accept card payments in order for the payment card companies to be comfortable that card holder information is secure. A vendor that does not comply with the data security standards may be liable for any losses resulting from a security breach in which card information is compromised.

Another example of a rule, which might be included in a device policy in a government office setting, is a requirement that every network device display a banner at login presenting certain information (e.g., login procedures, legal warnings, reminders about security procedures, etc.). More generally, certain devices allow the administrator to specify certain rules that the device configuration must follow, and these rules would be incorporated into the overall policy for that device. Policy rules may come from specific standards, such as the Information Technology Infrastructure Library (ITIL), the Health Insurance Portability and Accounting Act (HIPAA) standards, or the Sarbanes-Oxley Act. There are also organizational best practices, where an organization decides it will run all of its devices with a particular configuration. Similarly, there are industry best practices where certain configurations have been widely adopted with respect to specific architectures or equipment based on collective experience (e.g., certain routers should not be run using a specific combination of modes due to known performance problems that may result).

The collection of all such rules from a variety of sources constitutes the policy for a particular device. Depending on the nature of an individual device and its role in the network, different rules may apply to different devices, such that the applicable policy may vary from device to device. In analyzing the policy, a device's configuration is evaluated relative to each rule, and information about compliance and non-compliance with each rule can be determined and reported. Optionally, the policy violations can be categorized by severity, and an indication of the severity of the policy violation can be reported. When a new rule is added to the policy of one or more devices, the level of policy compliance among the devices in the network (or a specific group of devices in the network) may initially decline and then recover as the network administrator corrects device configurations to comply with the new rule (e.g., installing a newly required version of software on all devices). The visualization of the degree of policy compliance allows one to see whether compliance is improving or falling behind over time.

The following example illustrates the difference between an operational issue and non-compliance with a policy rule. Referring again to the server auto-negotiation of the Ethernet duplex mode setting, a best practice for servers may require not employing the auto-negotiation of the duplex mode setting but rather fixing the settings on both sides of the connection to a particular value. In the event of an auto-negotiated duplex mode setting mismatch, not only would an operational issue be identified as described above (i.e., the devices are not configured properly), but also non-compliance with the policy of not configuring devices via the auto-configuration feature would be identified.

FIG. 1 illustrates a network analysis system 100 for collecting, processing, and displaying information that relates to device configuration changes, operational issues, and policy compliance information for a group of devices in a network. Network analysis system 100 includes a data collection module 110, a processor 140, and a user interface 150. The architecture depicted in FIG. 1 is a conceptual diagram illustrating major functional units, and does not necessarily illustrate physical relationships. The network analysis system described herein can be implemented, for example, as a software application that runs on an appliance or general purpose computer with IP/Ethernet network access.

Figure 2:
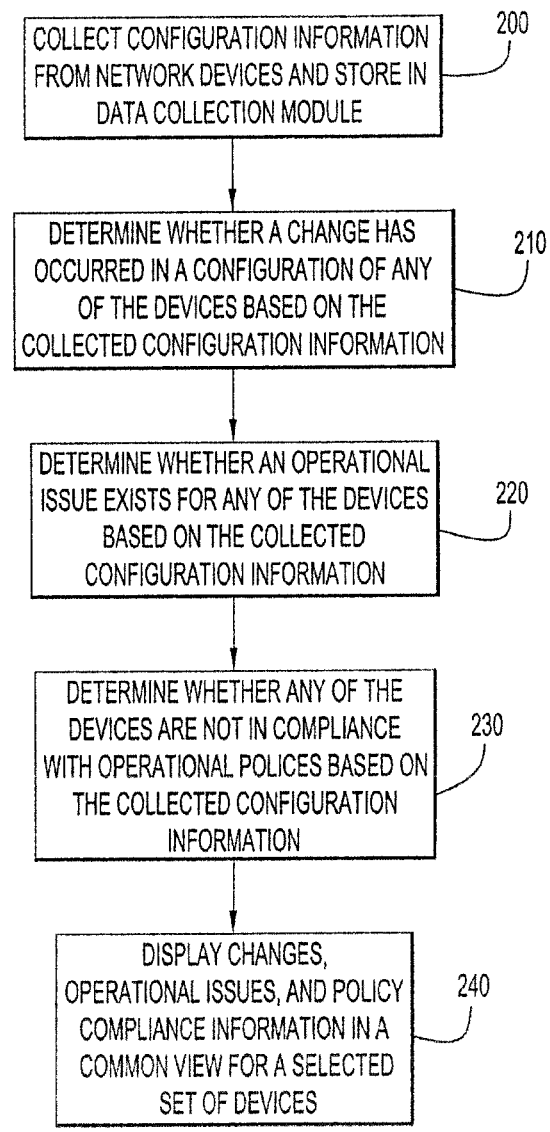
FIG. 2 is a function flow diagram of operations for collecting, processing, and displaying information that relates to changes, operational issues, and policy compliance for a group of devices in a network according to an exemplary embodiment.

FIG. 2 is a flow diagram depicting operations performed by a network analysis system in the process of generating a visual data presentation of changes, operational issues, and policy compliance information for a group of devices in a network. The operations shown in FIG. 2 will be described in connection with the network analysis system of FIG. 1.

Data collection module 110 includes a controller module 130 responsible for coordinating and controlling network analysis system 100. For example, controller 130 may be responsible for interacting with the network infrastructure devices that operate the network via standard interfaces and IP communications protocols such as Simple Network Management Protocol (SNMP), Secure Shell (SSH), Telnet, etc. Through this interaction, data collection module 110 gathers network device status, performance statistics, and configuration settings (operation 200 in FIG. 2), all of which it stores in a combination of database tables and files in its file system, represented in FIG. 1 by storage module 120.

Information can be gathered from devices in a number of ways. For example, devices can be configured to automatically report configuration information or changes and performance and operating information to network analysis system 100 via messages without specific prompting (e.g., a periodic configuration report or a configuration change report in response to a configuration change). Network analysis system 100 may be configured to request configuration and operational information from devices by periodically initiating communication with devices for the purpose of determining whether a change has occurred. For example, data collection module 110 can login to a device (e.g., via an SNMP interface) and look for indications of change. Data collection module 110 can also be configured to pull files from these devices that represent the way they are configured and look for evidence of change in those files. This can be mechanized by configuring network analysis system 100 with the credentials to be able to access these devices via SNMP.

Further, network analysis system 100 can be configured with specific login credentials for a command line interface for accessing network devices. In this manner, network analysis system 100 can periodically login to devices as if it were a user and generate commands to access and retrieve certain configuration and operational information and store this information in storage module 120 for later analysis.

Once configuration and operational information has been collected by data collection module 110, controller 130 instructs processor 140 to analyze the information. Referring to FIG. 2, in operation 210, processor 140 determines from the configuration information gathered by data collection module 110 whether one or more changes have been made to the network infrastructure, including the configuration of individual devices. Essentially, processor 140 filters through the configuration information, which reflects all indications of activity within the network devices, and determines whether any changes have occurred. For example, if the state of the hardware, software, settings, etc. of a device has changed relative to a previous state, the device has undergone a change. Processor 140 specifically identifies what changes, if any, have occurred for each device.

In operation 220, processor 140 determines from the collected configuration and operational information whether the configuration or operation of the network infrastructure has specific issues that should be corrected to improve its performance, reliability, or security. The collected configuration information represents the current configuration of the devices in the network, and operational issues for specific devices can be identified based on the current configuration and from operating conditions. As previously noted, examples of the types of operational issues that may be found include improper or inefficient configurations, component failures, failure states, and overutilization of resources.

In operation 230, processor 140 determines from the collected configuration and operational information whether or not the configuration of the network infrastructure conforms to established policy or accepted best practices. In particular, based on the current configurations of the network devices, processor 140 identifies each instance of non-compliance of any rule within the set of policy rules that is applicable to each device. Information determined by processor 140 about changes, operational issues, and policy compliance can be stored in storage module 120 for later retrieval and display.

Referring again to FIG. 1, network analysis system 100 provides the results of its analysis along with the underlying data to users via user interface 150, which can be an interactive web-based interface. User interface 150 includes a display device and one or more mechanisms for receiving input from a user (e.g., mouse, keypad, touch screen, etc.). Controller 130 controls the display device of user interface 150 to display visual data presentations of changes, operational issues, and policy compliance information (operation 240 in FIG. 2).

The display device of user interface 150 can be any of a wide variety of known devices, such as an LCD display whose optical state is transformed by controlling the color of light emitted by individual pixels based on signals managed by controller 130. For example, the display device can be a graphical user interface (GUI) which allows the user to selectively control the format and content of the display. The display/interface capability may allow access to visual data presentations via interfaces at a number of sites or via a web-based interface accessible to authorized customers or service provider personnel. Optionally, to correct problems, or merely for operational convenience, the user may employ the user interface to command the network analysis system to perform scripted interactions to modify the configuration of individual or groups of devices.

Viewed independently, each piece of information the network analysis system provides may be interesting and useful, but each lacks the context needed for a user to draw conclusions about the impacts that one has on another. To address this, in case of changes having impacts on policy compliance and network operational issues, the network analysis system provides three specialized visual data presentations that allow the user to easily draw such conclusions. These visual data presentations include: a graphical timeline view; a topology visualization; and a table representation, as described below in greater detail.

Each of the visual data presentations can be controlled to depict information about a selected group of the devices within the network (including the set of all devices in the network). Devices within the network can be categorized into device groups based on attributes of the devices that may be meaningful within the business enterprise, and the user can look at the whole network or just a selected part of it containing certain devices. It is possible that an individual device could be included in a number of different groups, depending on the type of device, its configuration, its placement within the topology of the network or connections with other devices, or its role in the network. For example, in the case of devices handling credit card information within a network, one device group may be defined as those devices that auditors have decided need to comply with payment card industry standards. The devices in this group may be required to comply with certain policy rules relating to the industry standards that are inapplicable to other devices in the network. The device group whose changes, issues, and policy compliance information is to be depicted in the visual data presentations can be selected by the user via a displayed menu or the like.

Each of the visual data presentations can be filtered to depict information about changes, issues, and policy compliance as a function of time. For example, a "time" icon or menu selection allows the user to select a date or hours of interest and, optionally, to alter the range of data shown (e.g., one day of data, six hours of data, etc.).

In any system, there will be a variety of different types of changes, issues, and policy rules. Accordingly, the changes, issues, and policy rules can be grouped into types, classes, or categories. Optionally, each of the visual data presentations can be filtered according to specific types, classes, or categories of changes, issues, and policy rules to facilitate further causal analysis between certain types of changes and certain types of issues and/or policy compliance violations.

Figure 3:
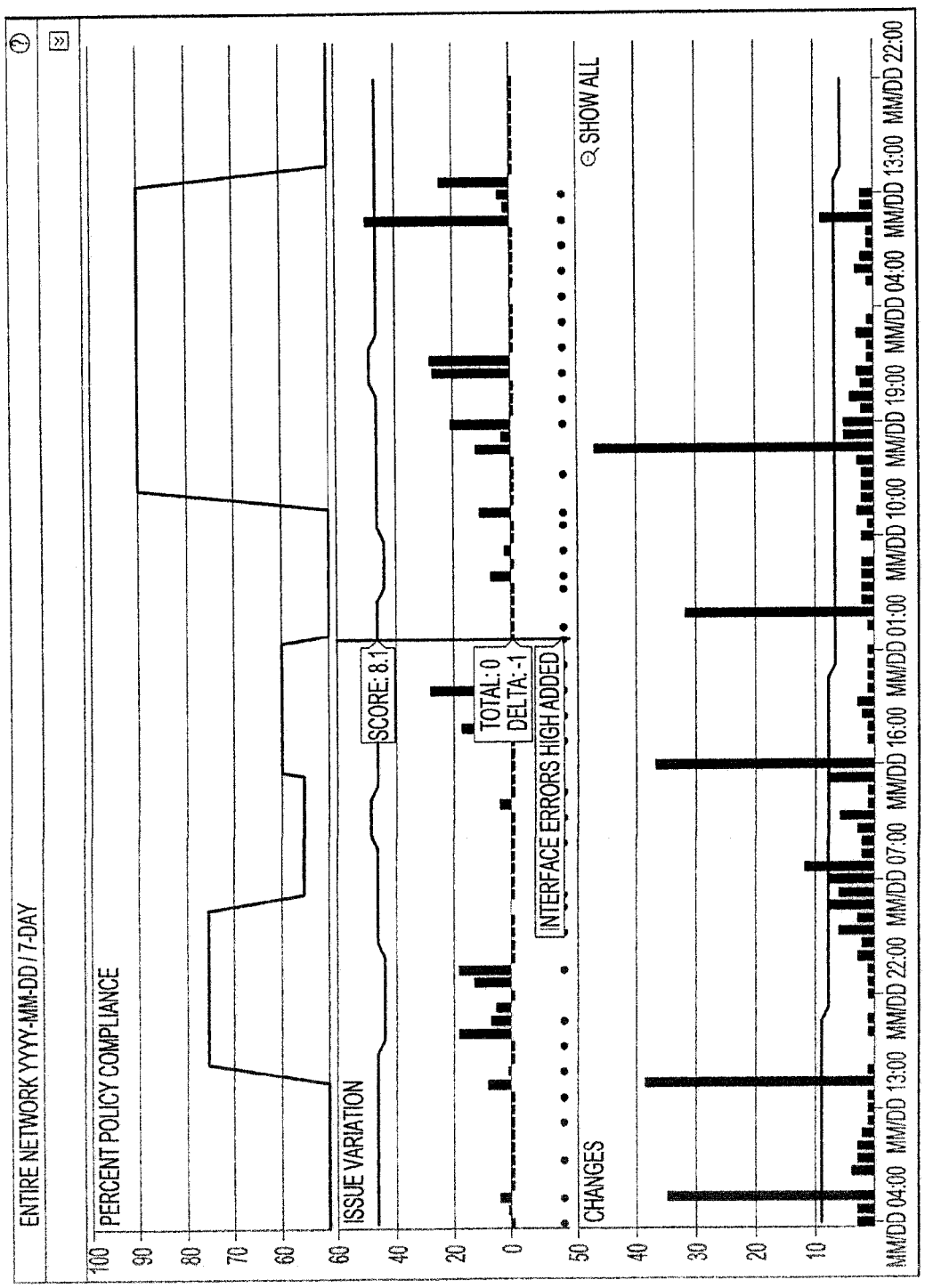
FIG. 3 is a screen shot of a timeline visualization of changes, issues, and policy compliance for a selected group of devices in a network.

An example of a change timeline presentation (or simply "timeline view") is shown in FIG. 3. The network analysis system displays three time-series graphs stacked one above the other. The lowermost chart is a change graph displayed on a timeline which shows a count of the number of configuration changes that have occurred in each of a sequence of regular time periods for a selected group of devices in the network. In particular, the change graph can be a bar graph with time along the x-axis and the count total for each time period along the y-axis. Each "bar" represents the total number of changes that have occurred within the selected group of devices within that particular time interval. In the example shown in FIG. 3, the change counts are tallied in one hour time increments (i.e., each bar represents the number of changes that have occurred within the group of device in one hour), and several days worth of one-hour intervals are depicted on the change graph. Preferably, the change counts for each time period reflect only the new changes that occurred in that time period (rather than an accumulation of changes over time) so that current trends are more readily discernable from the change graph.

The display device can be configured to include a hover ("mouse over") feature within the timeline view, whereby hovering over a data element with a pointer or mouse-controlled cursor causes additional information about the data element to be displayed in a pop-up box or window which can be temporarily overlaid on a portion of the timeline view. In the case of the change graph, if the user moves and holds the cursor over a particular "bar" in the graph, the display is altered to show additional information such as a listing providing a numeric breakdown of the change count represented by that particular bar by category or type of change (e.g., the number of administrative changes, the number of hardware changes, the number of software changes, etc.). Optionally, the items in the list displayed as a result of the cursor hover-over can have hyperlinks to different data presentations with more detailed information about the changes (e.g., a listing of all the hardware changes in a particular time period). As previously mentioned, the data being presented in the change graph can be filtered to show only selected types or categories of changes. For example, the user may be able to select one or more change categories from a drop-down menu or list.

A trend line (e.g., a line graph) is overlaid on the change graph and depicts a measure of the number of changes that have occurred over a significant number of time periods, perhaps over a longer period of time than what is depicted in the timeline view. For example, the trend line can indicate the total number of changes that have occurred over the past seven days. The trend line informs the user of whether a group of devices (or the whole network) is entering a period of more frequent change or less frequent change. Hovering over a point along the trend line with the mouse pointer shows a tally of the different types of changes and the value of the trend line at that point. The value shown in the trend line can be a raw total of changes over the longer period of time or an average per time period over the longer period of time, which allows the trend line to be scaled to the same y-axis as the change graph. As shown in FIG. 3, the trend line can be updated less frequently than every time period. In this case, the trend line is updated one a day. However, the trend line could be updated more frequently (e.g., every hour).

The middle chart in the timeline view is an issue graph on a timeline that shows a count of the number of operational issues identified in each of a sequence of regular time periods (i.e., the same time periods as the change graph) for a selected group of devices in the network. Like the change graph, the issue graph can be a bar graph with time along the x-axis and the count total for each time period along the y-axis (in this example, the issue counts are tallied in one hour time increments). According to one option, each "bar" represents the total number of operational issues within the selected group of devices that are open or outstanding during that particular time interval, so that the number of issues depicted accumulates over time unless issues are resolved or closed (i.e., an issue remains in the count until resolved rather than disappearing from the count after the time period in which it is first identified).

According to another option, each "bar" represents the total number of operational issues that have been identified for the selected group of devices within that particular time interval. In other words, the issue counts for each time period reflect the new issues that have been identified in that time period (rather than an accumulation of issues over time). In this implementation, the issue graph essentially depicts a measure of variation in the number of new issues from one time period to the next so that current trends are more readily discernable from the issue graph. Optionally, the issue counts in the issue graph can reflect both the number of new issues that were identified during a time period as well as the number of preexisting issues that were resolved or closed during that time period. Each new issue would increase the issue count by one and each resolved issue would decrease the issue count by one (e.g., for a time period in which there are more issues resolved than there are new issues, the issue count would be negative).

Hovering over each issue count "bar" with the mouse pointer opens a pop-up viewing box in the display which shows the total issue count being depicted via the bar as a numeral and also shows the change (or "delta") of the issue count relative to the preceding time period or relative to an average number of issues over a longer period of time. Below the x-axis of the issue graph, a row of circles is depicted, with each circle corresponding to the time period with which it is aligned. Hovering over one of the circles below the issue graph causes a list of any new issues or any issues that were resolved during the corresponding time period to be displayed in a viewing window. Here again, the information displayed in the window can be at a category level rather than at an individual issue level or individual device level. Optionally, further information can be obtained by drilling down via a hyperlink.

As with the change graph, the data being presented in the issue graph can be filtered to show only selected types or categories of issues (e.g., using a drop-down menu or list). Optionally, the types of issues being depicted can be coordinated with the types of changes being depicted to provide meaningful information about the relationship between the subsets of changes and issues being represented.

Overlaid on the issue graph is a line graph that shows a "score" that the network analysis system has assessed for the network conditions at that point in time. Hovering over the score line at any point along the line causes the numeric score value at that time to be displayed in a viewing window. According to one implementation, the score is essentially a metric that factors in the number of issues, the type of issues, and the severity of issues in a weighted computation. By way of a non-limiting example, each category or type of issue can have a certain weighting, and each issue can have a weighting that relates to a certain level of severity (e.g., error, warning, information). A score can be computed based on a weighted metric that takes into account the number of issues and the type and severity weightings.

Referring again to FIG. 3, the uppermost chart is a policy compliance graph (e.g., a line graph) that indicates a degree of policy compliance for the selected group of devices as a function of time. The policy compliance graph helps the user or system administrator see whether policy compliance is improving or degrading over time and is depicted on the same timeline as the change graph and issue graph. In the example shown in FIG. 3, policy compliance is depicted as a percentage relative to total compliance with all policy rules for all the devices in the selected group. According to one approach, the percentage can indicate the percentage of devices in the group that are in complete compliance with all applicable policy rules (i.e., either a device is completely compliant or it is not). In this scenario, if there are four devices in a group, and two of the devices are not in compliance with at least one policy rule, the displayed policy compliance percentage is 50%. According to another option, the percentage can indicate the percentage of policy rules that are complied with across the group of devices as a whole. In this scenario, for example, if there are four devices in the group, and if each device must follow five policy rules, and two of the devices are not in compliance with one of the their rules, the policy compliance percentage is 90% (note that this scenario would yield a 50% compliance under the first approach).

Like the change and issue graphs, the data being presented in the policy compliance graph can be filtered to show only selected types or categories of policy rules, and the types of policy rules being represented can be coordinated with the types of changes and issues being represented in their respective graphs to provide meaningful information about the relationship between the subsets of changes, issues, and policy compliance information being depicted.

Figure 4:
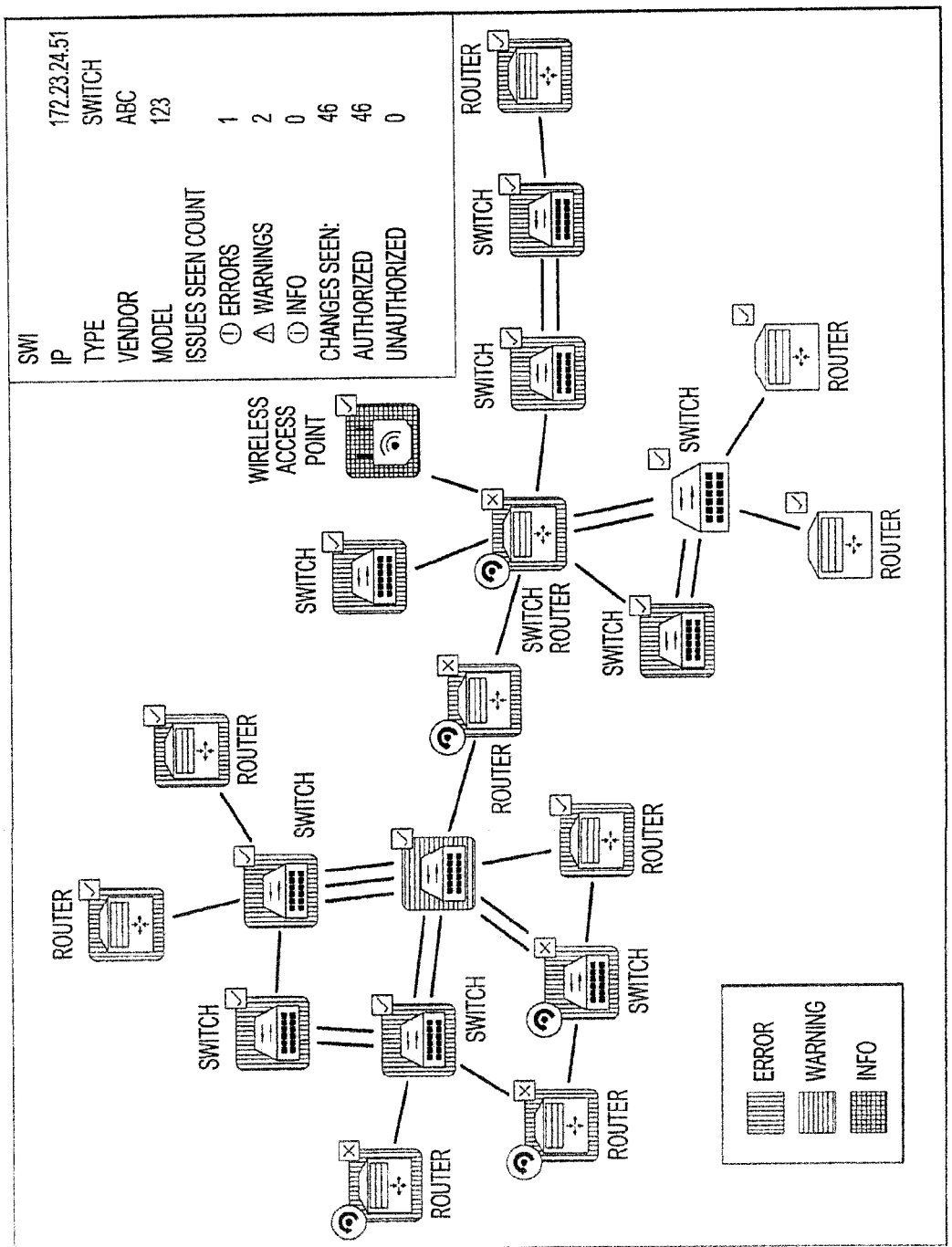
FIG. 4 is a screen shot of a topology visualization of changes, issues, and policy compliance for a selected group of devices in a network.

An example of a topology visualization representation (or simply "topology view") of changes, issues, and policy compliance information is shown in FIG. 4. In the topology visualization representation, the network analysis system provides various relationship diagrams of network infrastructure devices. These diagrams may visualize different relationships between the same devices per user preference, reflecting the different forms of physical and virtual network topology layers and connectivity. Further, these diagrams can visualize a distinct path of network traffic between two systems to facilitate troubleshooting of devices along the path. At the user's choice, these diagrams can be annotated with colors and symbols to identify which devices have experienced a change, are experiencing operational issues, or do not comply with established configuration policy.

Each device in the network or a selected group of devices in the network is depicted in the topology view by a device indicator, such as an icon, symbol, or text that suggests a particular type of device. For example, in the diagrammatic view shown in FIG. 4, different icons are used to show switches, routers, switch routers, wireless access points, etc. For clarification in FIG. 4, the text "switch," "router," etc. is also depicted next to the icons; however, in the actual topology view displayed on a display device, the text can be omitted or replaced with other device attribute information such as name or network address. The displayed device indictors are interconnected with lines indicating a number of connections between pairs of devices at the protocol layer the display device is showing. For example, if a physical connection layer (data link layer 2) is being shown, two lines between a pair of devices would represent that there are two physical connections between the devices. By hovering the cursor over a connection, additional information about the connection is displayed in a pop-up window.

Note that the topology view differs from the timeline view in that the changes, issues, and policy compliance information in the topology view is presented on a device-by-device basis. This allows the user or administrator to quickly see which devices may need attention in the context of a diagram. Hovering over a device indicator with the cursor causes additional details about the changes, operational issues, and policy compliance specific to that device to be displayed in a pop-up box or window, as suggested by the window in the upper right of the topology view shown in FIG. 4.

A change indicator is displayed with the device indicator of each device for which a configuration change has occurred within a certain time period (e.g., the last twenty-four hours). In FIG. 4, the change indicator appears as a circular symbol with a semi-circular arrow rotating around a central dot and is positioned at the upper left of the device indicator to which it relates. A sliding time window can be used such that, once no change has occurred for a device within the past twenty-four hours, the change indicator is removed from that device in the topology view.

An issue indicator associated with the device indicator of each device for which an operational issue exists is also displayed in the topology view. The issue indicator can be, for example, a colored or patterned background that surrounds the device indicator. The presence of a colored or patterned background around the device indicator indicates that at least one operational issue exists for that device, whereas no background can signify the absence of any operational issues for that device. The particular color or pattern of the issue indicator can signify the severity or significance of the most severe or significant issue that exists for the device. For example, a red background or a vertical line pattern (FIG. 4) can signify an error condition (most severe). A blue background or a horizontal line pattern (FIG. 4) can signify a warning (less severe), and a yellow background or a checked pattern (FIG. 4) can signify an informational issue (least severe). While, in this example, issues are indicated with a colored or patterned background, other indicators can also be used, such as icons or symbols.

A policy compliance indicator is displayed with the device indicator of each device that is not policy compliant. Optionally, one symbol can be shown with the device indicators of non-compliant devices, and another symbol can be shown with the device indicators of compliant devices. For example, in FIG. 4, the policy compliance indicator appears as a square symbol to the upper right of the device indicator, with either a check mark (policy compliant) or an "X" mark (not policy compliant). Thus, in this example, two different symbols are used for compliance and non-compliance, respectively. Optionally, different policy compliance indicators can be used to indicate the severity or significance of the most severe or significant policy violation of a device (e.g., using different colors with the same non-compliance symbols or using different symbols).

As with the timeline view, the topology view can be filtered according to specific types, classes, or categories of changes, issues, and policy rules to facilitate further causal analysis between certain types of changes and certain types of issues and/or policy compliance violations. The filtering can be performed, for example, by selecting certain categories of changes, issues, and policy rules from a drop-down menu or list.

An example of a table representation (or simply "table view") of changes, issues, and policy compliance information is shown in FIG. 5. The table is displayed in a display window, with a header line that includes a number of column headers identifying the devices in the selected group and attributes of the devices, including: the IP address, the device name, the device type, the vendor, and the model number. Each row in the table includes the device and attribute information for a specific device such that a listing of devices extends vertically down the display window (e.g., with a column of IP addresses, a column of device names, etc.).

According to one option, the header line also includes column headers for a change field, an issue field, and a policy compliance field (respectively labeled "Changes," "Issues," and "Policy Compliance" in FIG. 5). In each row, the change field provides information about changes for that particular device. For example, in FIG. 5, the change field is filled with a numeral that indicates how many changes have occurred within a particular period of time (e.g., the past twenty-four hours). According to another option, the change field can simply indicate whether or not at least one configuration change has occurred for that particular device. Collectively, the change field column in the table indicates which of the devices in the selected group have had (and have not had) changes in the time period of interest.

The issue field for each device indicates whether the device is experiencing any operational issues. Different indicators or symbols can be depicted in the issue field to indicate a degree of severity or significance of the device's most severe or significant operational issue. For example, an exclamation point in a circle can signify an error condition, an exclamation point in a triangle can signify a warning, and an "i" in a circle can signify information. Likewise, colors can be used in conjunction with or instead of symbols, or an issue count can be represented by a numeral in the issue field. Collectively, the issue field column in the table indicates which of the devices within the selected group have (and do not have) operational issues.

The policy compliance field for each device indicates whether or not the device complies with established configuration policy. Different indicators or symbols can be depicted in the policy compliance field to indicate compliance, non-compliance, or different levels or extents of non-compliance on a device-by-device basis. For example, in FIG. 5, a box with a check mark indicates a device is policy compliant, and a box with an "X" indicates a device is not policy compliant. Collectively, the policy compliance field column in the table indicates which of the devices within the selected group are and are not policy compliant.

Optionally, one or more of the change, issue, and policy compliance fields can be represented in the table without use of a separate column. For example, color can be used to highlight the device name of a device that has at least one operational issue, with the color indicating the severity of the most severe issue. Likewise, the device name can be annotated with a symbol or icon to indicate a change or policy compliance information without introducing a separate column into the table. It will be appreciated that a variety of other display mechanisms and options could be used to effectively depict the change, issue, and policy compliance fields in the table view.

Optionally, the table view is a data presentation that can be drilled into from a hyperlink within the timeline view, maintaining the device group originally selected for the timeline view. From the table view, more specific information about a particular device can drilled into by selecting a hyperlink (e.g., the device name or any of the aforementioned fields can be hyperlinked), which would bring up a device viewer on the display device. As with the timeline and topology views, the table view can be filtered according to specific types, classes, or categories of changes, issues, and policy rules to facilitate further causal analysis between certain types of changes and certain types of issues and/or policy compliance violations.

Having described preferred embodiments of methods, apparatus, and software for identifying the impact of changes in computer networks, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus, comprising:
a processor configured to analyze configuration information collected from a plurality of devices in a computer network, and further configured to:
determine whether a configuration change has occurred in a configuration of any of the devices based on the collected configuration information, wherein the configuration change of a device refers to a modification or alteration to the device's software, hardware, or setting configuration;
determine whether an operational issue exists for any of the devices based on the collected configuration information, wherein the operational issue refers to an indication of a problem condition that should be addressed by a system administrator or a condition that may be of interest to the system administrator, and wherein the operational issue relates to an improper or inefficient configuration, a component failure, a failure state, an overutilization of resources, or any combination thereof;
determine whether any of the devices are not in compliance with operational policies based on the collected configuration information, wherein the operational policies refer to a collection of rules that the plurality of devices in the computer network are required or expected to follow; and wherein the determining of whether any of the devices are not in compliance with operational policies comprises:
determine a number of operational policies that a device fails to comply with;
determine a severity weight of each operation policy that the device fails to comply with;
calculate a value based on a first severity weight of a first operation policy that the device fails to comply with;
assign a first severity degree to the device in the event that the value is less than a first threshold;
assign a second severity degree to the device in the event that the value is greater than a second threshold; and
assign a third severity degree to the device in the event that the value is greater than the first threshold and less than the second threshold; and
generate a visual data presentation that includes a representation of device configuration changes, operational issues, and policy compliance information for a group of devices in the computer network;
wherein the representation of device configuration changes, operational issues, and policy compliance information for the group of devices in the computer network facilitates causal analysis between configuration changes, operational issues, or policy compliance information, or any combination thereof.

2. The apparatus of claim 1, the apparatus further comprising:
a data collection module configured to collect the configuration information from the plurality of devices in the computer network.

3. The apparatus of claim 1, wherein the visual data presentation comprises a timeline view, the timeline view further comprising:
a change graph displayed on a timeline and indicating a number of configuration changes that occurred in each of a sequence of time periods for a selected group of devices in the computer network, wherein the change graph and the issue graph are bar graphs;
an issue graph displayed on the timeline and indicating a number of operational issues in each of the sequence of time periods for the selected group of devices; and
a policy compliance graph displayed on the timeline and indicating a degree of policy compliance for the selected group of devices as a function of time.

4. The apparatus of claim 1, wherein the visual data presentation comprises a timeline view, the timeline view further comprising:
a change graph displayed on a timeline and indicating a number of configuration changes that occurred in each of a sequence of time periods for a selected group of devices in the computer network;
an issue graph displayed on the timeline and indicating a number of operational issues in each of the sequence of time periods for the selected group of devices; and
a policy compliance graph displayed on the timeline and indicating a degree of policy compliance for the selected group of devices as a function of time;
wherein the timeline view further comprises a change trend line indicating a measure of a number of configuration changes over a plurality of time periods.

5. The apparatus of claim 1, wherein the visual data presentation comprises a timeline view, the timeline view further comprising:
a change graph displayed on a timeline and indicating a number of configuration changes that occurred in each of a sequence of time periods for a selected group of devices in the computer network;
an issue graph displayed on the timeline and indicating a number of operational issues in each of the sequence of time periods for the selected group of devices; and
a policy compliance graph displayed on the timeline and indicating a degree of policy compliance for the selected group of devices as a function of time;
wherein the processor is further configured to generate a hover feature within the timeline view such that additional information about graphically represented configuration changes or operational issues is displayed based on a display position of a user-controlled cursor.

6. The apparatus of claim 1, wherein the visual data presentation comprises a topology view of a selected group of devices in the network, the topology view further comprising:
a device indicator for each device in the selected group;
a change indicator associated with the device indicator of each device for which a configuration change has occurred within a certain time period;
an issue indicator associated with the device indicator of each device for which an operational issue exists, wherein the issue indicator indicates a degree of significance of a device's most significant operational issue; and
a policy compliance indicator associated with the device indicator of each device that is not in compliance with operational policies.

7. The apparatus of claim 1, wherein the visual data presentation comprises a table view of a selected group of devices in the network, the table view further comprising:
a listing of the selected group of devices;
a change field indicating which of the devices in the listing have had a configuration change within a certain time period;
an issue field indicating which of the devices in the listing have operational issues, a symbol in the issue field indicating a degree of significance of a device's most significant operational issue; and
a policy compliance field indicating which of the devices in the listing are not in compliance with operational policies.

8. The apparatus of claim 1, wherein the processor is further configured to generate a plurality of visual data presentations for a selected group of devices, further comprising:
a timeline view of graphical data relating to device configuration changes, operational issues, and policy compliance;
a topology view of devices and associated configuration changes, operational issues, and policy compliance information; and
a table view of devices and associated configuration changes, operational issues, and policy compliance information.

9. The apparatus of claim 1, wherein the processor is further configured to generate a plurality of visual data presentations for a selected group of devices, further comprising:
a timeline view of graphical data relating to device configuration changes, operational issues, and policy compliance;
a topology view of devices and associated configuration changes, operational issues, and policy compliance information; and
a table view of devices and associated configuration changes, operational issues, and policy compliance information;
wherein at least one of the timeline view, the topology view, and the table view includes hyperlinks to other visual data presentations relating to more specific information about device configuration changes, operational issues, and policy compliance.

10. The apparatus of claim 1, wherein the processor is further configured to filter the visual data presentation to represent only selected categories of device configuration changes, operational issues, and policy compliance information for a group of devices in the computer network.

11. The apparatus of claim 1, wherein a policy compliance indicator relating to a device indicates compliance of an operational policy of the device in the event the compliance of the operational policy of the device exceeds a threshold.

12. The apparatus of claim 1, wherein an operational policy for one device is different from another operational policy for another device.

13. A method, comprising:
determining using a processor whether a configuration change has occurred in a configuration of any of the devices based on collected configuration information, wherein the configuration change of a device refers to a modification or alteration to the device's software, hardware, or setting configuration;
determining using the processor whether an operational issue exists for any of the devices based on the collected configuration information, wherein the operational issue refers to an indication of a problem condition that should be addressed by a system administrator or a condition that may be of interest to the system administrator, and wherein the operational issue relates to an improper or inefficient configuration, a component failure, a failure state, an overutilization of resources, or any combination thereof;
determining using the processor whether any of the devices are not in compliance with operational policies based on the collected configuration information, wherein the operational policies refer to a collection of rules that the plurality of devices in the computer network are required or expected to follow, and wherein the determining of whether any of the devices are not in compliance with operational policies comprises:
   determining a number of operational policies that a device fails to comply with;
   determining a severity weight of each operation policy that the device fails to comply with
   calculating a value based on a first severity weight of a first operation policy that the device fails to comply with;
   assigning a first severity degree to the device in the event that the value is less than a first threshold;
   assigning a second severity degree to the device in the event that the value is greater than a second threshold; and
   assigning a third severity degree to the device in the event that the value is greater than the first threshold and less than the second threshold; and
generating a visual data presentation that includes a representation of device configuration changes, operational issues, and policy compliance information for a group of devices in the computer network;
wherein the representation of device configuration changes, operational issues, and policy compliance information for the group of devices in the computer network facilitates causal analysis between configuration changes, operational issues, or policy compliance information, or any combination thereof.

14. The method of claim 13, the method further comprising:
   collecting, in a data collection module, configuration information from the plurality of devices in the computer network.

15. The method of claim 13, wherein generating the visual data presentation includes generating a timeline view, the timeline view comprising:
   a change graph displayed on a timeline and indicating a number of configuration changes that occurred in each of a sequence of time periods for a selected group of devices in the computer network, wherein the change graph and the issue graph are bar graphs;
   an issue graph displayed on the timeline and indicating a number of operational issues in each of the sequence of time periods for the selected group of devices; and
   a policy compliance graph displayed on the common timeline and indicating a degree of policy compliance for the selected group of devices as a function of time;
   wherein the timeline view further includes a change trend line indicating a measure of a number of configuration changes over a plurality of time periods.

16. The method of claim 13, wherein generating the visual data presentation includes generating a topology view of a selected group of devices in the network, the topology view further comprising:
   a device indicator for each device in the selected group;
   a change indicator associated with the device indicator of each device for which a configuration change has occurred within a certain time period;
   an issue indicator associated with the device indicator of each device for which an operational issue exists; and
   a policy compliance indicator associated with the device indicator of each device that is not in compliance with operational policies.

17. The method of claim 13, wherein generating the visual data presentation includes generating a table view of a selected group of devices in the network, the table view further comprising:
   a listing of the selected group of devices;
   a change field indicating which of the devices in the listing have had a configuration change within a certain time period;
   an issue field indicating which of the devices in the listing have operational issues, a symbol in the issue field indicating a degree of significance of a device's most significant operational issue; and
   a policy compliance field indicating which of the devices in the listing are not in compliance with operational policies.

18. The method of claim 13, wherein a policy compliance indicator relating to a device indicates compliance of an operational policy of the device in the event the compliance of the operational policy of the device exceeds a threshold.

19. A computer program product, the computer program product being embodied in a tangible, non-transitory computer readable storage medium and comprising computer instructions for:
   determining whether a configuration change has occurred in a configuration of any of the devices based on collected configuration information, wherein the configuration change of a device refers to a modification or alteration to the device's software, hardware, or setting configuration;
   determining whether an operational issue exists for any of the devices based on the collected configuration information, wherein the operational issue refers to an indication of a problem condition that should be addressed by a system administrator or a condition that may be of interest to the system administrator, and wherein the operational issue relates to an improper or inefficient configuration, a component failure, a failure state, an overutilization of resources, or any combination thereof;
   determining whether any of the devices are not in compliance with operational policies based on the collected configuration information, wherein the operational policies refer to a collection of rules that the plurality of devices in the computer network are required or expected to follow, and wherein the determining of whether any of the devices are not in compliance with operational policies comprises:
      determining a number of operational policies that a device fails to comply with;
      determining a severity weight of each operation policy that the device fails to comply with;
      calculating a value based on a first severity weight of a first operation policy that the device fails to comply with;
      assigning a first severity degree to the device in the event that the value is less than a first threshold;
      assigning a second severity degree to the device in the event that the value is greater than a second threshold; and
      assigning a third severity degree to the device in the event that the value is greater than the first threshold and less than the second threshold; and
   generating a visual data presentation that includes a representation of device configuration changes, operational issues, and policy compliance information for a group of devices in the computer network;
   wherein the representation of device configuration changes, operational issues, and policy compliance information for the group of devices in the computer network facilitates causal analysis between configuration changes, operational issues, or policy compliance information, or any combination thereof.

20. The computer readable non-transitory medium of claim 19, the computer readable non-transitory medium further comprising:
collecting configuration information from the plurality of devices in the computer network.

21. The computer readable non-transitory medium of claim 19, storing further instructions, that when executed by a computer, cause the computer to perform the further functions of:
generating the visual data presentation as a timeline view, the timeline view comprising:
a change graph displayed on a timeline and indicating a number of configuration changes that occurred in each of a sequence of time periods for a selected group of devices in the computer network, wherein the change graph and the issue graph are bar graphs;
an issue graph displayed on the timeline and indicating a number of operational issues in each of the sequence of time periods for the selected group of devices; and
a policy compliance graph displayed on the common timeline and indicating a degree of policy compliance for the selected group of devices as a function of time.

22. The computer readable non-transitory medium of claim 19, storing further instructions, that when executed by a computer, cause the computer to perform the further functions of:
generating the visual data presentation as a topology view of a selected group of devices in the network, the topology view comprising:
a device indicator for each device in the selected group;
a change indicator associated with the device indicator of each device for which a configuration change has occurred within a certain time period;
an issue indicator associated with the device indicator of each device for which an operational issue exists; and
a policy compliance indicator associated with the device indicator of each device that is not in compliance with operational policies.

23. The computer readable non-transitory medium of claim 19, storing further instructions, that when executed by a computer, cause the computer to perform the further functions of:
generating the visual data presentation as a table view of a selected group of devices in the network, the table view comprising:
a listing of the selected group of devices;
a change field indicating which of the devices in the listing have had a configuration change within a certain time period;
an issue field indicating which of the devices in the listing have operational issues, a symbol in the issue field indicating a degree of significance of a device's most significant operational issue; and
a policy compliance field indicating which of the devices in the listing are not in compliance with operational policies.

24. The computer readable non-transitory medium of claim 19, wherein a policy compliance indicator relating to a device indicates compliance of an operational policy of the device in the event the compliance of the operational policy of the device exceeds a threshold.

* * * * *